United States Patent Office 2,887,490

Patented May 19, 1959

2,887,490

COLOR STABILIZATION OF POLYMERIZABLE HETEROCYCLIC NITROGEN COMPOUNDS

Mack F. Potts and Warren L. Smith, Bartlesville, Okla., and Paul S. Hudson, Iowa City, Iowa, assignors to Phillips Petroleum Company, a corporation of Delaware No Drawing. Application August 5, 1952
Serial No. 302,831

11 Claims. (Cl. 260—290)

This invention relates to the color stabilization of polymerizable materials. In one of its aspects this invention relates to a method for inhibiting color formation in polymerizable heterocyclic nitrogen compounds. In another of its aspects this invention relates to a method for inhibiting color formation in polymerizable heterocyclic nitrogen compounds under storage conditions. In still another of its aspects this invention relates to improved color-stabilized polymerizable heterocyclic nitrogen compounds.

It is well known that unsaturated, polymerizable heterocyclic nitrogen compounds have a marked tendency to color upon storage. This characteristic is exceedingly undesirably especially when said compounds are to be employed in the preparation of polymeric materials for the production of fibers to be used in the manufacture of textiles and the like.

Accordingly, it is an object of this invention to provide a method for inhibiting color formation in polymerizable heterocyclic nitrogen compounds.

It is another object of this invention to inhibit color formation in polymerizable heterocyclic nitrogen compounds under storage conditions.

A further object of this invention is to provide a color-stabilized composition comprising a polymerizable heterocyclic nitrogen compound.

It is yet another object of this invention to provide a color stabilized composition comprising a vinyl-substituted pyridine.

Further and additional objects of this invention will be apparent upon reading the accompanying disclosure and claims.

We have discovered a process for inhibiting color formation in polymerizable heterocyclic nitrogen compounds by the addition of small amounts thereto of hydroxylamine or acid salts of hydroxylamine or N-alkyl or N-aryl substituted hydroxylamines or acid salts of said N-substituted hydroylamines. The hydroxylamine compounds which are applicable in the practice of this invention include hydroxylamine; hydroxylamine hydrochloride; hydroxylamine sulfate; hydroxylamine phosphate; hydroxylamine nitrate; hydroxylamine acetate; and hydroxylamine formate. The N-alkyl and N-aryl substituted hydroxylamines such as N-methylhydroxylamine; N-ethylhydroxylamine; N-propylhydroxylamine; N-phenylhydroxylamine; N-allylhydroxylamine; and N-benzylhydroxylamine as well as the acid salts of N-substituted hydroxylamines are also applicable in the practice of this invention, such as N-methylhydroxylamine hydrochloride; N-ethylhydroxylamine hydrochloride; N-propylhydroxylamine hydrochloride; N-phenylhydroxylamine hydrochloride; N-allylhydroxylamine hydrochloride; N-benzylhydroxylamine hydrochloride and the sulfuric, nitric, phosphoric, acetic, and formic acid salts of the foregoing substituted hydroxylamine compounds.

We have found that the color stabilizers of our invention are effective agents for inhibiting color formation in the polymerizable heterocyclic nitrogen compounds at temperatures encountered in ordinary storage conditions, and include temperatures up to about 125° F., depending upon the individual compounds being color-stabilized. The amount of the color stabilizer employed will depend upon the particular heterocyclic nitrogen compound being color-stabilized and the time and temperature under which it is desired to effect said stabilization.

A trace of the color-stabilizing hydroxylamine compound is sufficient in the presence of a polymerizable heterocyclic nitrogen compound to color-stabilize same. Usually, an amount in the range between 0.005 to 5 weight percent preferably 0.01 to 2 weight percent based on the weight of the polymerizable heterocyclic nitrogen compounds being color stabilized is used. Larger amounts even as high as 10% by weight and higher can be used if desired. Under most circumstances, however, this is not necessary.

Our color stabilizers, in order to be especially effective, should preferably be in intimate contact with the polymerizable heterocyclic nitrogen compound. If desired after addition of color-stabilizer, preferably a salt of hydroxylamine, to a polymerizable heterocyclic nitrogen compound, the mixture can be stirred to promote dispersion and/or solution of the hydroxylamine salt therein.

The recovery of the hydroxylamine salt from the polymerizable heterocyclic nitrogen compounds with which it is admixed can be effected in several ways. After storage or shipment of the color-stabilized hetercyclic nitrogen compounds, the compounds can be separated and recovered from the color-stabilizing hydroxylamine salt, either by distillation, preferably under reduced pressure, or by any other convenient method.

Preferred polymerizable heterocyclic nitrogen compounds which can be color-stabilized in accordance with our invention are the mono- and divinylpyridines, with the vinyl group being present in any of the several positions in the pyridine nucleus. Alkyl groups can be present on the ring or on the alpha carbon atom of the vinyl group, but the number of carbon atoms in the combined alkyl groups should generally not be greater than 12. These alkyl groups are preferably methyl and ethyl groups. These preferred vinylpyridine compounds have the structural formula:

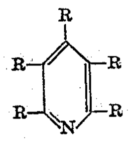

where R is selected from the group consisting of hydrogen, alkyl, vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 3-vinylpyridine; 4-vinylpyridine; 2,5-divinylpyridine; 2-methyl-5-vinylpyridine; 2-vinyl-5-ethylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5-(alpha-methylvinyl) pyridine; 3,5-di(alpha-methylvinyl) pyridine; and the like.

Those skilled in the art will appreciate that for the purposes of this invention compounds of the above nature substituted with non-interfering groups, for example halo- and nitro-, are the same as those compounds listed.

An incidental and attendant advantage of our invention is that our vinylpyridines color-stabilized with hydroxylamine hydrochloride are also less subject to polymerization than the same vinylpyridine not containing hydroxylamine hydrochloride.

Other polymerizable heterocyclic nitrogen compounds which can be used in the practice of this invention include those vinyl and alpha-methylvinyl substituted heterocyclic nitrogen compounds in which the ring structure is unsaturated, partially saturated and completed saturated. Examples include vinyl and alpha-methylvinyl substituted quinolines, isoquinolines, piperidines (hexahydropyridines), pyrroles, pyrrolidines, pyrrolidones, especially the vinyl-substituted pyrrolidones, piperidines, pyrroles, pyrrolidines, quinolines, isoquinolines, and alkyl derivatives of the foregoing compounds, dihydro and tetrahydropyridines, partially hydrogenated quinolines and isoquinolines, and pyrrolines (dihydropyrroles). Examples of such compounds are 2-vinylquinoline; 8-ethyl-2-vinylquinoline; 4-hexyl-5-vinylquinoline; 1-vinylisoquinoline; 5-methyl-1-isopropenylisoquinoline; 1,8-divinylisoquinoline; N-vinylpyrrolidone; 3-vinylpyrrolidone; N-vinylpyrrole; 4-vinylpyrrole; vinylpiperidine; N-vinylpyrrolidine; 3-vinylpyrrolidine; N-vinylcarbazole; and 5-vinylcarbazole and the like.

The following example set forth hereinafter is illustrative of a preferred embodiment of this invention showing comparative results and improvements obtained by this invention. However, as indicated this example is merely illustrative and it is to be understood that the invention is not to be unduly limited by the specific example shown.

*Example*

Tests were made wherein samples of 2-methyl-5-vinylpyridine containing varying amounts of hydroxylamine hydrochloride were placed in sealed containers and stored at 75° F. The samples were observed at regular intervals and color formation therein was noted. An untreated control was run for comparison. Results are recorded below:

| Amount of hydroxylamine hydrochloride, wt. percent | Atmosphere | Gardner color at end of— | | | |
|---|---|---|---|---|---|
| | | 1st week | 2d week | 3rd week | 4th week |
| 0.1 | Air | Water white. | Water white. | Water white. | Water white. |
| 0.1 | Nitrogen | do | do | do | Do. |
| 0.01 | Air | do | 6 | | |
| 0 | Air | 10 | | | |
| 0 (Temp., 25° F.). | Air | 1 | 1 | 2 | |

As will be obvious to those skilled in the art many substitutions, variations, modifications can be made in the light of the foregoing disclosure without departing from the spirit or scope of this invention.

We claim:

1. A process of inhibiting color formation in a polymerizable vinylpyridine compound with a color-stabilizing amount of a compound selected from the group consisting of hydroxylamine, N-alkyl substituted hydroxylamine, N-aryl substituted hydroxylamine, and the acid salts of hydroxylamine and its N-substituted alkyl and aryl derivatives.

2. The process according to claim 1 wherein the color-stabilizer is hydroxylamine hydrochloride.

3. The process according to claim 2 wherein the color-stabilizer is from about 0.005 to about 5.0 weight percent of hydroxylamine hydrochloride.

4. A process of inhibiting color formation in a polymerizable vinylpyridine represented by the formula

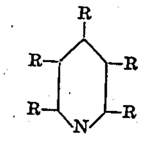

wherein each R is individually selected from the group consisting of H, alkyl, vinyl and alpha-methyl vinyl radicals, at least one and not more than two of said radicals being selected from the group consisting of vinyl and alpha-methylvinyl, and the total number of carbon atoms in the alkyl radicals being not greater than 12, with a color-stabilizing amount of a compound selected from the group consisting of hydroxylamine, N-alkyl substituted hydroxylamine, N-aryl substituted hydroxylamine, and the acid salts of hydroxylamine and its N-substituted alkyl and aryl derivatives.

5. The process according to claim 4 wherein the color-stabilizer is hydroxylamine hydrochloride.

6. The process according to claim 5 wherein the polymerizable vinylpyridine is 2-methyl-5-vinylpyridine and the color-stabilizer is from about 0.01 to about 2.0 weight percent of hydroxylamine hydrochloride.

7. A polymerizable vinylpyridine compound having incorporated therein from about 0.01 to about 2.0 weight percent of a compound selected from the group consisting of hydroxylamine, N-alkyl substituted hydroxylamine, N-aryl substituted hydroxylamine, and the acid salts of hydroxylamine and its N-substituted alkyl and aryl derivatives.

8. The compound according to claim 7 wherein the amine is hydroxylamine hydrochloride.

9. Vinylpyridine having incorporated therein from about 0.01 to about 2.0 weight percent of hydroxylamine hydrochloride.

10. A polymerizable lower-alkyl substituted vinylpyridine having incorporated therein from about 0.005 to about 5.0 weight percent of hydroxylamine hydrochloride.

11. A 2-methyl-5-vinylpyridine having incorporated therein from about 0.01 to about 2.0 weight percent of hydroxylamine hydrochloride.

References Cited in the file of this patent

UNITED STATES PATENTS

| | | |
|---|---|---|
| 2,287,188 | Matheson | June 23, 1942 |
| 2,320,859 | Foord | June 1, 1943 |
| 2,556,845 | Kauffman | June 12, 1951 |
| 2,607,775 | Vinton | Aug. 19, 1952 |
| 2,611,769 | Hays | Sept. 23, 1952 |

OTHER REFERENCES

Olander: Zeitschrift für physikalische Chemie, vol. 129, pp. 1–32, abstracted in Chemical Abstracts, vol. 22, p. 344 (7).

Dunbrook: Serial No. 767,360, 644 O.G. 623.4 (1951).

Frank et al.: J. Am. Chem. Soc., vol. 68, p. 908 (1946).